United States Patent
Huang et al.

(10) Patent No.: US 9,122,560 B2
(45) Date of Patent: Sep. 1, 2015

(54) SYSTEM AND METHOD OF OPTIMIZATION FOR MOBILE APPS

(71) Applicant: Verizon Patent and Licensing Inc., Basking Ridge, NJ (US)

(72) Inventors: Jian Huang, Sudbury, MA (US); Jack Jianxiu Hao, Lexington, MA (US)

(73) Assignee: VERIZON PATENT AND LICENSING INC., Basking Ridge, NJ (US)

( * ) Notice: Subject to any disclaimer, the term of this patent is extended or adjusted under 35 U.S.C. 154(b) by 294 days.

(21) Appl. No.: 13/677,721

(22) Filed: Nov. 15, 2012

(65) Prior Publication Data

US 2014/0137080 A1 May 15, 2014

(51) Int. Cl.
*G06F 9/45* (2006.01)
*G06F 9/44* (2006.01)
*G06F 9/445* (2006.01)
*G06F 11/34* (2006.01)

(52) U.S. Cl.
CPC ............. *G06F 8/71* (2013.01); *G06F 9/44505* (2013.01); *G06F 11/3409* (2013.01); *G06F 11/3495* (2013.01); *G06F 2201/865* (2013.01)

(58) Field of Classification Search
CPC . G06F 8/443; G06F 11/3409; G06F 11/3495; G06F 2201/1865
USPC ................................................... 717/151, 158
See application file for complete search history.

(56) References Cited

U.S. PATENT DOCUMENTS

| | | | | |
|---|---|---|---|---|
| 7,917,147 | B2* | 3/2011 | Bond | 455/446 |
| 8,677,315 | B1* | 3/2014 | Anderson et al. | 717/110 |
| 2003/0145080 | A1* | 7/2003 | Breese et al. | 709/224 |
| 2003/0200305 | A1* | 10/2003 | Tarby et al. | 709/224 |
| 2006/0143601 | A1* | 6/2006 | Concha et al. | 717/170 |
| 2007/0061429 | A1* | 3/2007 | Lin | 709/220 |
| 2009/0249290 | A1* | 10/2009 | Jenkins et al. | 717/109 |
| 2012/0278194 | A1* | 11/2012 | Dewan et al. | 705/26.1 |
| 2013/0074093 | A1* | 3/2013 | Gounares et al. | 718/104 |
| 2013/0111038 | A1* | 5/2013 | Girard | 709/226 |
| 2013/0232331 | A1* | 9/2013 | Farhan et al. | 713/100 |
| 2013/0326488 | A1* | 12/2013 | Reuven | 717/135 |

* cited by examiner

*Primary Examiner* — Chameli Das
*Assistant Examiner* — Viva Miller (57) ABSTRACT

A network device provides an agent application to a user device. The network device receives, from the user device, device information that relates to performance of one or more applications residing on the user device. The network device provides, to a device associated with a registered developer account, a portion of the device information that is associated with a particular application. The network device receives, from the device associated with the registered developer account, optimized device configuration settings for the particular application on the user device. The network device stores the optimized configuration settings for the particular application and sends, to the user device, the optimized configuration settings for the particular application.

20 Claims, 10 Drawing Sheets

SYSTEM AND METHOD OF OPTIMIZATION FOR MOBILE APPS

BACKGROUND

Application software, also referred to as an "app," is computer software designed to help a user perform one or more specific tasks. Apps may be downloaded to perform particular tasks for mobile devices, such as tablet computers, personal digital assistants (PDAs), smartphones, multimedia players, gaming systems, etc. Apps are typically designed to be executed on different mobile platforms (Android™, iOS™, etc.). A wide variety of mobile devices exist for each platform. A mobile device may use different hardware and software. Also, users of mobile devices may have different behaviors for using their mobile devices. All these difference can affect the performance of applications running on different devices.

DETAILED DESCRIPTION OF PREFERRED EMBODIMENTS

The following detailed description refers to the accompanying drawings. The same reference numbers in different drawings may identify the same or similar elements.

Figure 1:
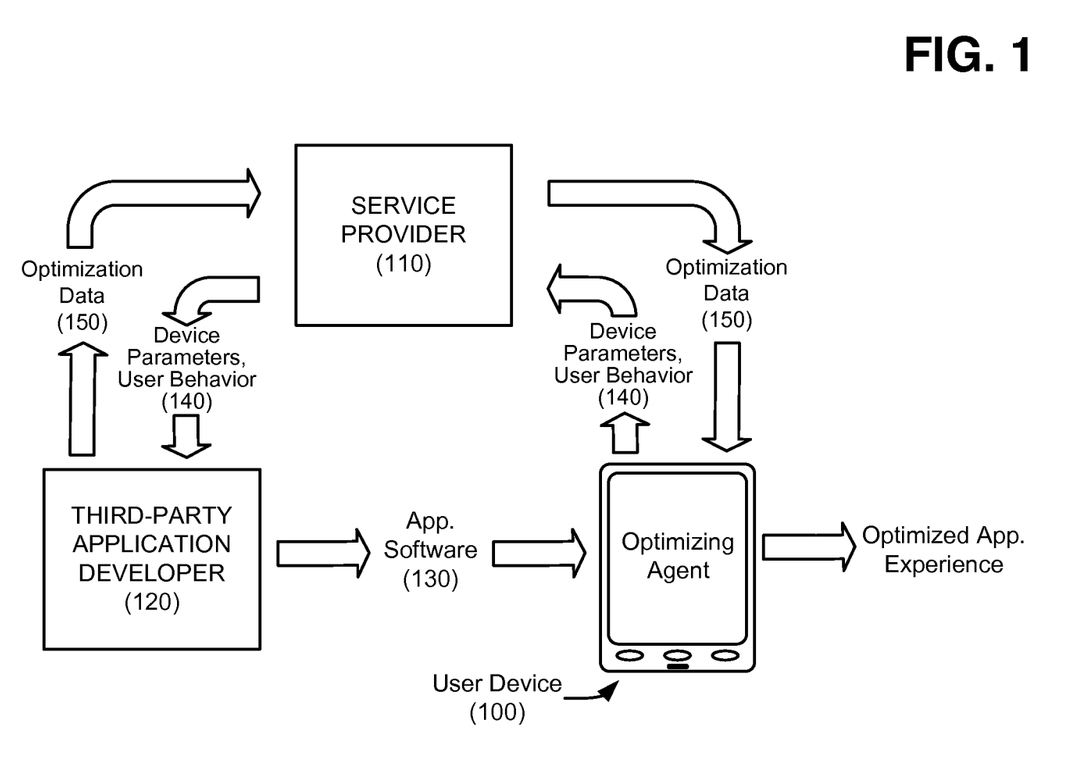
FIG. 1 is a diagram illustrating concepts described herein.

Systems and methods provided herein may provide a mobile application optimization architecture to improve a mobile user's experience. FIG. 1 is a diagram illustrating concepts described herein. As shown in FIG. 1, a user device 100 may be used to execute application software.

Different types of user devices 100 (e.g., different manufactures, models, etc.) may provide different kinds of hardware (e.g., screens, memory and central processing units (CPUs), etc.) and software (e.g., operating system). Furthermore, users may select different software (e.g., applications) and may exhibit different usage behaviors. Accounting for these differences by, for example, adjusting configuration settings of particular user device 100 can greatly improve the user experience for running a particular application on a particular user device 100.

In some instances, an application can run more smoothly when it has knowledge of the device hardware. For example, when scrolling a images on a screen of user device 100, a large amount of content (such as multimedia images) can be displayed. Usually an application can use a memory cache to preload the content to improve performance. When the amount of content is extremely large, the full content cannot be fully preloaded into memory. Hence, during the scrolling, the content needs to be loaded from a local hard disk cache or from a remote server through a network in real time. Scrolling the images will use a lot of CPU resources to repaint the screen, and loading contents such as images from the local hard disk or the remote server can use a lot of CPU resources. Due to this balance of limited CPU resources, an application may run smoothly on one user device 100, but may not be able to run smoothly on other user devices 100 with different hardware or user behavior.

If an application is to run smoothly on different devices, the application should account for a combination of particular device parameters and user behavior. In the scrolling screen example above, the application may need to account for the following parameters of user device 100:

Screen size—the application decides how much content (e.g., number of images) can be displayed on the screen at same time. A larger screen means more content should be displayed on the screen; thus a background thread should leave more CPU cycles for a main painting thread to paint the screen.

Memory size—the application decides the size of memory cache. A large memory means more images can be preloaded to improve performance.

CPU—the application decides the speed of screen scrolling and the frequency of background refresh threads, which will affect other scrolling threads to prepare images from the hard disk and/or the remote server.

Network speed—the application decides how fast content can be retrieved from the remote servers.

Furthermore, different users with different copies of the same application may have different user behaviors and preference for their respective user devices. For example, a mother may only use a particular movie application to search for theater information and buy tickets, while her daughter may like to watch streaming movies directly on her user device with the same movie application. Thus, the mom would benefit from an optimized searching system in the application, but the daughter may benefit more from optimizing the streaming system in the application.

According to implementations described herein, a mobile application optimization architecture is provided. Referring to FIG. 1, the architecture may include an agent component for user device 100, a central web service managed by a service provider 110, and an application optimization component for third-party application developers 120. User device 100 may be equipped with a local optimizing agent for monitoring and optimizing the use of particular application software 130. The local optimizing agent may collect information from user device 100, such as device parameters and user behaviors 140 associated with application software 130. This information may be sent to service provider 110 and used by third-party application developers 120 to generate optimization data 150 for particular device types and/or users. The local optimizing agent on user device 100 may receive optimization data 150 via service provider 110 and implement configuration settings (based on device parameters and user behaviors 140 and/or optimization data 150) to provide an optimized application experience to the user.

Figure 2:
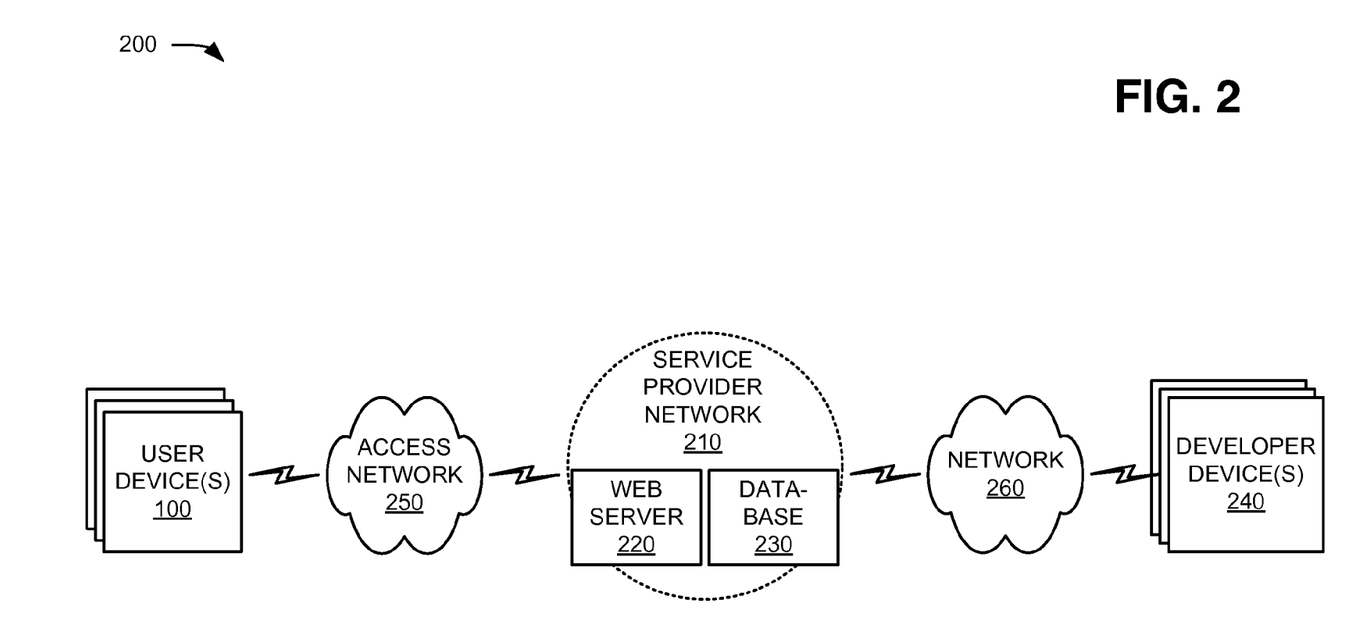
FIG. 2 is a diagram illustrating an exemplary network in which systems and/or methods described herein may be implemented.

FIG. 2 is a diagram illustrating an exemplary network 200 in which systems and methods described herein may be implemented. As illustrated, network 200 may include one or more user devices 100, a service provider network 210 including a web server 220 and a database 230, one or more developer device(s) 240, an access network 250, and a network 260. Components of network 200 may be connected via wired and/or wireless links.

User device 100 may include a mobile device or a stationary device that is capable of executing one or more applications. For example, user device 100 may include a computational and/or communicational device, such as a radiotelephone, a personal communications system (PCS) terminal (e.g., that may combine a cellular radiotelephone with data processing and data communications capabilities), a personal digital assistant (PDA) (e.g., that can include a radiotelephone, a pager, Internet/intranet access, etc.), a wireless device, a smart phone, a computer (e.g., personal computer, a laptop computer, or a tablet computer), a global positioning system (GPS) device, a gaming device, etc. In implementations described herein, user device 100 may be provided with a mobile optimization component that may provide an improved user experience for other resident applications by optimizing user device configuration settings for the other applications.

Service provider network 210 may include network devices that provide a backend support system for facilitating optimization for mobile applications. For example, service provider network 210 may permit user device 100 to download an optimizing agent (e.g., mobile optimization component 420 described below) to enable collection of user device information and receiving/implementation of optimization data. Service provider network 210 may include, for example, one or more private Internet Protocol (IP) networks that use a private IP address space. Service provider network 210 may include a local area network (LAN), an intranet, a private wide area network (WAN), etc. In one implementation, service provider network 210 may implement one or more Virtual Private Networks (VPNs) for providing communication between devices within service provider network 210. Service provider network 210 may be protected/separated from other networks, such as network 260, by a firewall. Although shown as a single element in FIG. 2, service provider network 210 may include a number of separate networks.

Web server 220 may include one or more network devices or computing devices that generally facilitate optimization of configuration settings for mobile applications. Web server 220 may receive and store user device information from user devices 100. Web server 220 may also receive requests (e.g., from developer devices 240) for device records (e.g., that relate to particular applications) and provide appropriate device information to developer devices 240. Web server may also receive optimization data (e.g., configuration settings for user devices 100) from developer devices 240 and provide the optimization data to user devices for implementation.

Optimization database 230 may include a database or another data structure to store data that web server 220 receives from user device 100 and/or developer device 240. In one implementation, optimization database 230 may be a distributed component. As described further herein, data in optimization database 230 can be organized by third-party developer account, user device type (e.g., make/model), specific user device(s) 100, particular applications, and/or time. Optimization database 230 may store, for example, device data from user devices 100 for eventual distribution by web server 220 to qualified developer devices 240. Conversely, optimization database 230 may store configuration data from developer device 240 for use by user devices 100 to optimize presentation of particular applications on user devices 100.

Developer device 240 may include a computational or communicational device such as, for example, a desktop computer, a laptop computer, a personal digital assistant (PDA), etc., used for general computing tasks. In some implementations, developer device 240 may be configured to receive user device information from web server 220 and to provide optimization data to web server 220. Developer device 240 may also be used to register applications/accounts with service provider network 210.

Access network 250 may include a wireless communications network that connects subscribers (e.g., user devices 100) to a service provider (e.g., server provider network 210). In one example, access network 250 may include a long-term evolution (LTE) network, a WiFi network (e.g., using IEEE 802.11 standards) or other access networks (e.g., an E-UTRAN, an enhanced high-rate packet data (eHRPD) network, or another 3G, 4G, or future access network). In another example, access network 250 may include a radio access network 250 capable of supporting high data rate, low latency, packet optimization, large capacity and coverage, etc.

Public network 260 may include one or more networks including another wireless network, a satellite network, the Internet, a telephone network, such as the Public Switched Telephone Network (PSTN), a metropolitan area network (MAN), a wide area network (WAN), a local area network (LAN), a mesh network, a fiber-optics network (e.g., passive optical networks (PONS)), an ad hoc network, or another type of network. In an exemplary implementation, public network 260 may include a combination of networks and other components (e.g., switches, routers, etc.) for transmitting data to and from service provider network 210.

In FIG. 2, the particular arrangement and number of components of network 200 are illustrated for simplicity. In practice there may be more user devices 100, service provider networks 210, web servers 220, developer devices 240, access networks 250, and/or public networks 260. For example, there may be hundreds or thousands of user devices 100 and/or developer devices 240.

Figure 3:
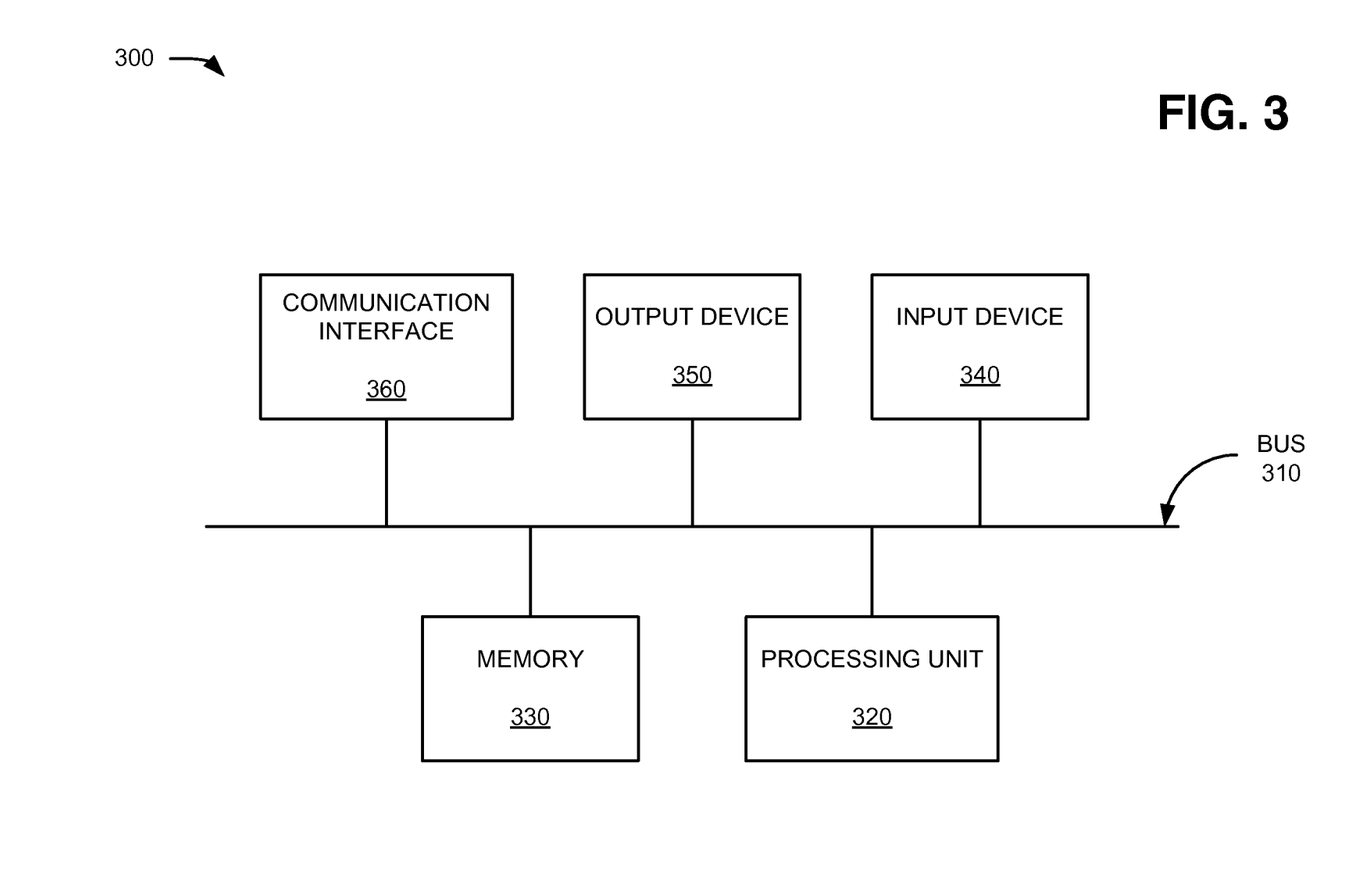
FIG. 3 is a block diagram illustrating exemplary components of a device that may correspond to one or more of the devices of FIG. 2.

FIG. 3 is a diagram illustrating exemplary components of a device 300. Each of user device 100, web server 220, and developer device 240 may be implemented/installed as a combination of hardware and software on one or more of device 300. As shown in FIG. 3, device 300 may include a bus 310, a processing unit 320, a memory 330, an input device 340, an output device 350, and a communication interface 360.

Bus 310 may permit communication among the components of device 300. Processing unit 320 may include one or more processors or microprocessors that interpret and execute instructions. In other implementations, processing unit 320 may be implemented as or include one or more application specific integrated circuits (ASICs), field programmable gate arrays (FPGAs), or the like.

Memory 330 may include a random access memory (RAM) or another type of dynamic storage device that stores information and instructions for execution by processing unit 320, a read only memory (ROM) or another type of static storage device that stores static information and instructions for the processing unit 320, and/or some other type of magnetic or optical recording medium and its corresponding drive for storing information and/or instructions.

Input device 340 may include a device that permits a user to input information to device 300, such as a keyboard, a keypad, a mouse, a pen, a microphone, one or more biometric mechanisms, and the like. Output device 350 may include a device that outputs information to the user, such as a display, a speaker, etc.

Communication interface 360 may include any transceiver-like mechanism that enables device 300 to communicate with other devices and/or systems. For example, communication interface 360 may include mechanisms for communicating with other devices, such as other devices of network 200.

As described herein, device 300 may perform certain operations in response to processing unit 320 executing software instructions stored in a computer-readable medium, such as memory 330. A computer-readable medium may include a non-transitory memory device. A memory device may be implemented within a single physical memory device or spread across multiple physical memory devices. The software instructions may be read into memory 330 from another computer-readable medium or read into memory 330 from another device via communication interface 360. The software instructions stored in memory 330 may cause processing unit 320 to perform processes described herein. Alternatively, hardwired circuitry may be used in place of or in combination with software instructions to implement processes described herein. Thus, implementations described herein are not limited to any specific combination of hardware circuitry and software.

Although FIG. 3 shows exemplary components of device 300, in other implementations, device 300 may include fewer components, different components, differently-arranged components, or additional components than those depicted in FIG. 3. As an example, in some implementations, a display may not be included in device 300. In these situations, device 300 may be a "headless" device that does not include input device 340. Alternatively, or additionally, one or more components of device 300 may perform one or more other tasks described as being performed by one or more other components of device 300.

Figure 4:
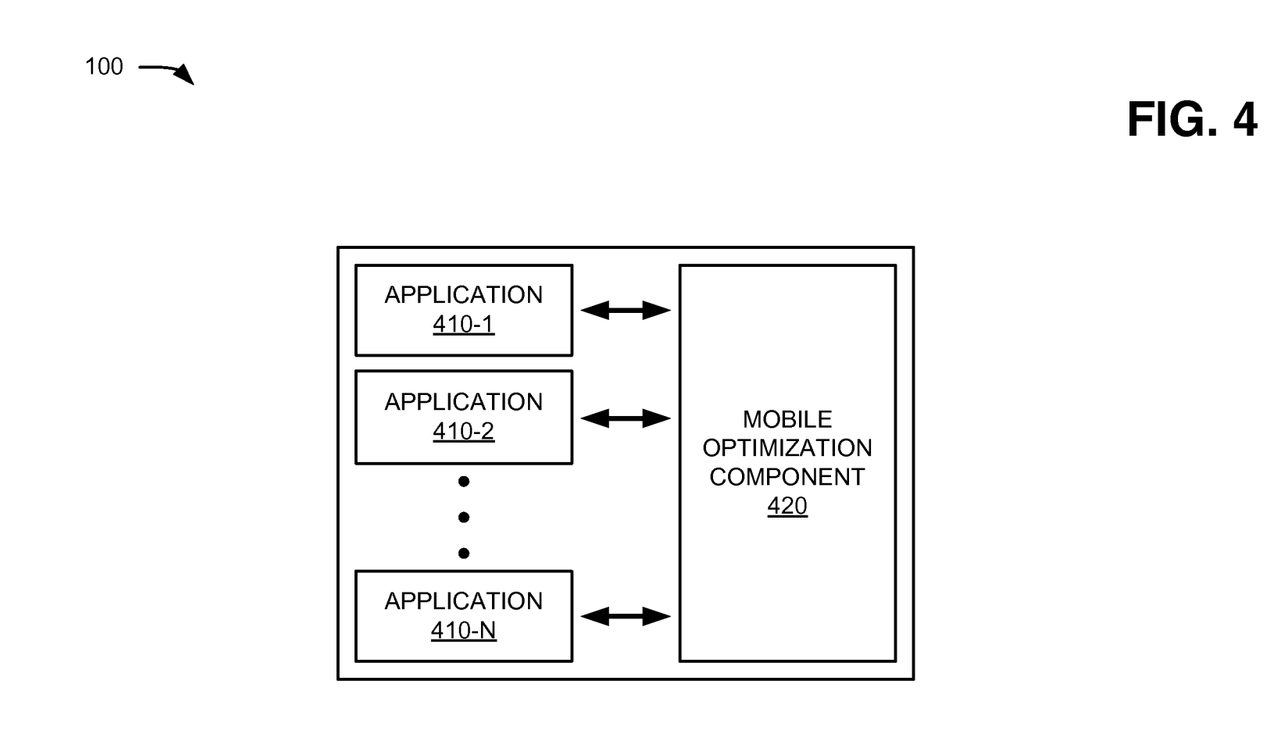
FIG. 4 is a block diagram illustrating exemplary functional components of a user device of the network of FIG. 2.

FIG. 4 is a block diagram illustrating an exemplary functional component of a user device 100. The functional component may be implemented by, for example, processing unit 320 in conjunction with memory 330. As shown in FIG. 4, user device 100 may include applications 410-1, 410-2, . . . , 410-N (referred to herein collectively as "applications 410" and generically as "application 410") and a mobile optimization component 420.

Application 410 may include software for performing a particular task or group of tasks relating to, for example, games, entertainment, news, productivity, calculations, travel, social networking, etc. Performance of application 410 operating on user device 100 may vary depending on particular device parameters and user behavior. Additionally, device parameters and user behaviors for one application 410 may affect another application 410 differently. Applications 410 may obtain optimized configuration settings from mobile optimization component 420 to improve the user experience.

Mobile optimization component 420 may include, for example, an application that provides a coordinated interface for applications 410, resident system files, and remote devices (e.g., web server 220). Mobile optimization component 420 may be obtained, for example, from service provider network 210 (e.g., web server 220 or another device). Mobile optimization component 420 may collect information from user device 100 and send the information to web server 220. The collected information may include (1) device information, such as a device make/model, network signal strength, flash-memory size, disk usage, CPU usage, etc.; (2) operating system information, such as event of an out of memory warning, a thread waiting queue size, a number of network communication time out, etc.; (3) application-relevant information data, such as search category, location information, media player behavior, particular content downloaded, etc.; and/or (4) user usage patterns, such as most frequently used applications, times most actively using specific applications, concurrent use of particular applications, etc.

Additionally, mobile optimization component 420 may receive and cache optimization information from web server 220 (e.g., which may first be sent to web server 220 from developer device 240). Mobile optimization component 420 may also provide service to mobile applications 410. Hence, mobile applications 410 can use the optimization information, such as network cache size, animation speed, favorite contents preload, optimized advertisement, etc., to improve the user experience for particular applications 410.

In one implementation, mobile optimization component 420 may provide centralized data collection policy control services for user device 100, such as security, privacy services, and a time schedule to send/receive data to/from web server 220. Mobile optimization component 420 may provide, for example, a graphical user interface (GUI) to permit a user to configure particular settings related to data collection for applications 410. For example, a user can decide whether to provide permission for GPS location information data collection for all applications 410 or for only particular (or no) applications 410. As another example, the user can decide a time to send/receive data from web server 220 (e.g., daily at midnight, during idle times, etc.). Mobile optimization component 420 may use a unified and standard format for sending/receiving collected data (from user device 100) or optimization data (from web server 220). Mobile optimization component 420 is described further in connection with FIG. 5.

Figure 5:
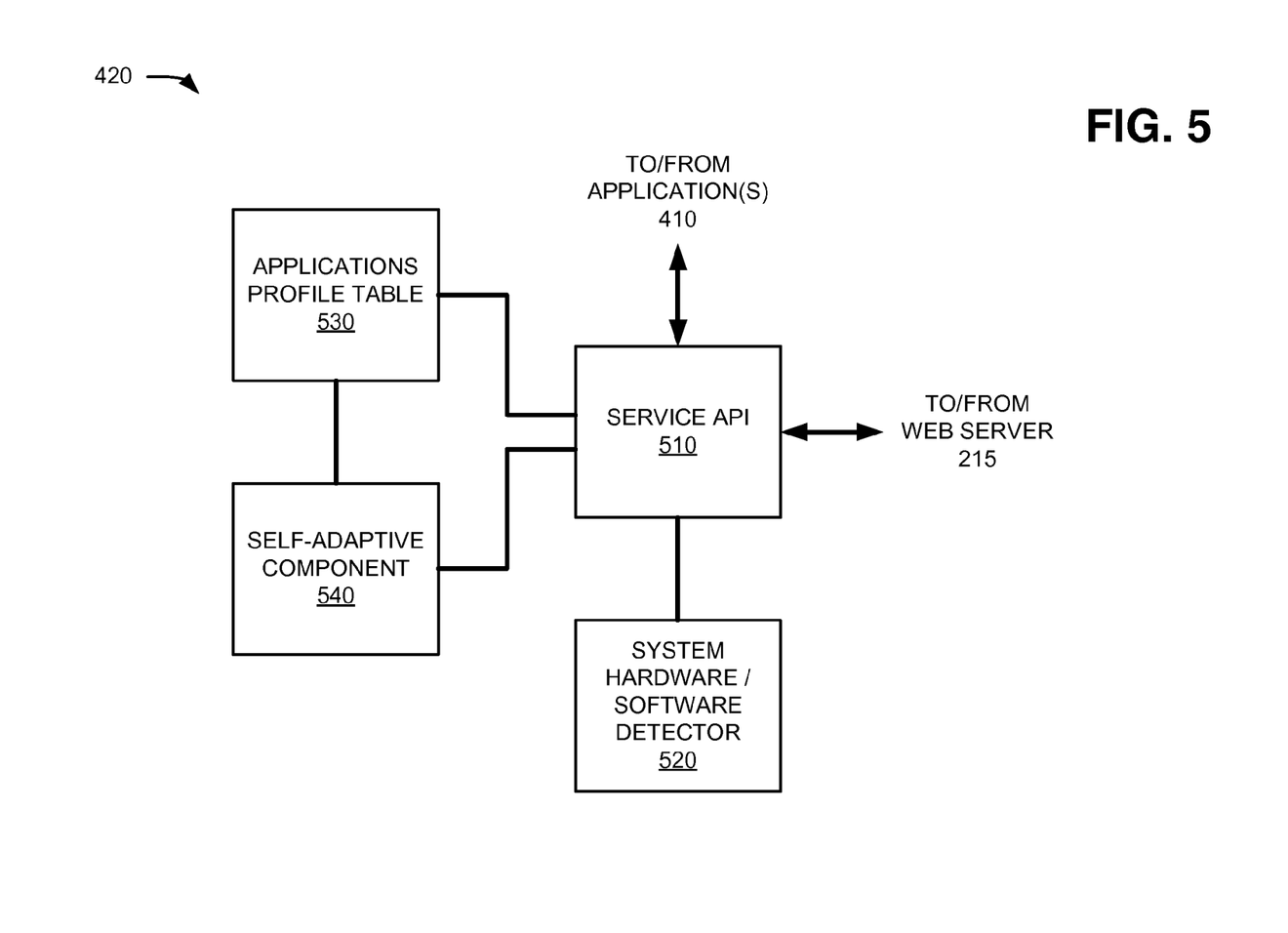
FIG. 5 is a block diagram illustrating exemplary functional components of a mobile optimization component of FIG. 4.

FIG. 5 is a block diagram illustrating exemplary functional components of a mobile optimization component 420. As shown in FIG. 5, mobile optimization component 420 may include a service application program interface (API) 510, a system hardware/software detector 520, an applications profile table 530, and a self-adaptive component block 540.

Service API 510 may listen to requests from applications (e.g., applications 410) running on user device 100. Service API 510 may include a standardized interface that may be used by any of applications 410. For example, any one of applications 410 can request history performance parameters from service API 510 to adjust current user interface performance for that particular application. Service API 510 may retrieve information from system hardware/software detector 520, applications profile table 530, and/or self-adaptive component 540 to send to applications 410 for use by particular applications 410.

Service API 510 may also retrieve information from system hardware/software detector 520 and/or applications profile table 530 to send to web server 220. In another implementation, service API 510 may receive, from web server 220, optimization settings for particular applications 410. Service API 510 may store the optimization settings, for example, in applications profile table 530 for responding to requests from applications 410.

System hardware/software detector 520 may detect user device 100 hardware and operating system capabilities. For example, system hardware/software detector 520 may detect screen size, screen resolution, memory, CPU, operating system, etc. In one implementation, system hardware/software detector may also collect application-relevant information data and user usage patterns. System hardware/software detector 520 may store the device parameters and usage data, and/or provide the device parameters to service API 510 for delivery to, for example, web server 220 and/or applications 410. Thus, any application 410 can also request history performance parameters to adjust current user interface performance.

Applications profile table 530 may include optimization information for each application (e.g., applications 410) residing on user device 100. Application profile table 530 may include, for example, configuration information received from self-adaptive component block 540 and/or from developer devices 240 (e.g., via web server 220). Application profile table 530 may include, for example, settings for scrolling speed, waiting thread queue size, animation speed, favorite contents preload, etc. that may optimize the user experience of particular applications 410.

Self-adaptive component 540 may customize the parameters for each applications running on user device 100. For example, self-adaptive component 540 may provide application adjustments (e.g., configuration settings) for applications that do not have optimized settings provided from third-party developers (e.g., via web server 220). Self-adaptive component 540 may handle application adjustments such as screen scrolling speed, waiting thread queue size, etc.

Mobile optimization component 420 may provide a standard protocol (e.g., service API 510) for applications 410 to reference. Thus, the same application 410 may be run on multiple devices with different hardware. Service API 510 may also provide the capability to run applications 410 on future devices. Mobile optimization component 420 may provide a customized optimization parameter for applications 410, such as scrolling-speed, thread task queue size, etc. Mobile optimization component 420 may also provide customized optimization parameters for each application 410 running on device 100. Additionally, mobile optimization component 420 may provide customized optimization parameters based on user behavior.

Figure 6:
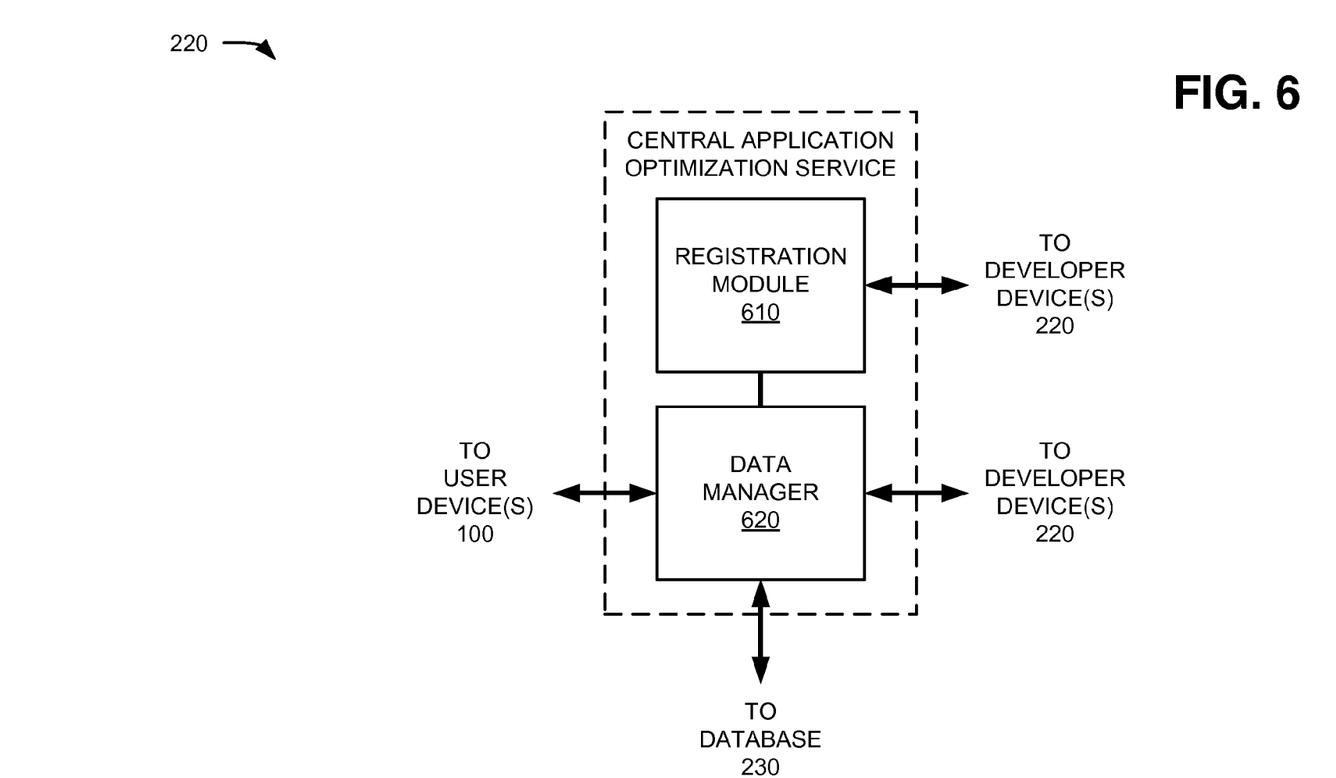
FIG. 6 is a diagram illustrating exemplary functional components of a web server of the network of FIG. 2.

FIG. 6 is a block diagram illustrating exemplary functional components of web server 220. The functional components may be implemented by, for example, processing unit 320 in conjunction with memory 330. As shown in FIG. 6, web server 220 may include a central application optimization service that includes a registration module 610 and a data manager 620.

Registration module 610 may solicit and accept registration input for accounts with third-party developers (e.g., via developer devices 240). For example, registration module 610 may assign a unique account identifier (ID) to each third-party developer that registers with the central application optimization service. Registration module 610 may include a password management feature to allow a third-party developer to select a password that can be used to restrict access to the central application optimization service. Registration module 610 may store (e.g., in memory 330) third-party developer account information to verify future login attempts and/or information requests. Third-party developers may also register applications to be associated with a particular third-party developer account. Each application may have a unique application identifier (ID). For example, a single third-party developer account may be associated with multiple applications. A user of a third-party developer account may retrieve (e.g., from data manager 620) device parameters and user behavior data (referred to herein generally as "device information") for applications that are associated with the particular third-party developer account.

Data manager 620 may receive data from user device 100 (e.g., mobile optimization component 420) and developer device 240. Data manager 620 may also respond to requests from user device 100 and developer device 240. For example, data manager 620 may receive user device data associated with a particular application and store the user device data in database 230. Data manager 620 may receive requests for user device information from developer devices 240. Based on an account and application associated with the request, data manager 620 may provide user device data to developer device 240. Data manager 620 may receive configuration optimization data from developer device 240 and store the optimization data in database 230. Data manager 620 may provide the optimization data to user devices 100 upon request. In another implementation, device manager 620 may actively push data to user devices 100 and/or developer devices 240 based on the configuration of specific accounts.

Figure 7:
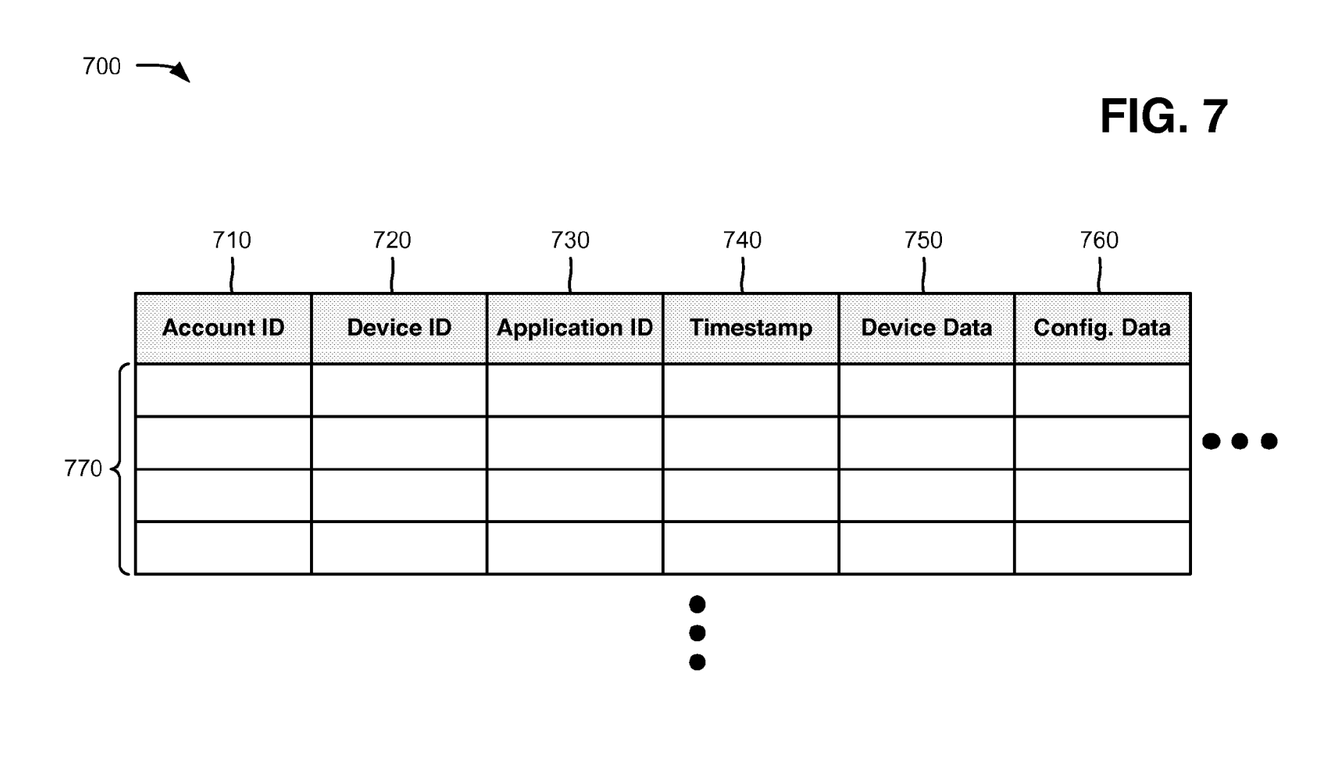
FIG. 7 is a diagram illustrating a portion of an exemplary table that may be used in the database of FIG. 2.

FIG. 7 is a diagram of an example data structure 700 that may correspond to database 230. As illustrated, data structure 700 may include a variety of information associated with applications (e.g., applications 410) on user devices 100. For example, data structure 700 may include an account ID field 710, a device ID field 720, an application ID field 730, a time stamp field 740, a device data field 750, a configuration data field 760, and a variety of entries 770 associated with fields 710-760.

Account ID field 710 may include an alpha-numeric string associated with a registered third-party developer. For example, each third-party developer may have a unique account ID.

Device ID field 720 may include a unique identifier for user device 100 or an identifier for a particular device type. For example, device ID may correspond to a previously-assigned unique identifier, such as a mobile directory number (MDN) or media access control (MAC) address, or an original alpha-numeric string that uniquely identifies a particular user device 100. Alternatively, device ID field may include a make/model indication for a particular type of user device 100 (e.g., that may be used by multiple users).

Application ID field 730 may include a globally unique identifier for a particular application. For example, each application (and version) created by a third party developer and registered with web server 220 may be assigned a unique identifier. The unique identifier may include a designated alpha-numeric string, a hash value, or another form of identification.

Time stamp field 740 may include a date and time indication that a particular communication is received from user device 100 or developer device 240.

Device data field 750 may include device information received from mobile optimization component 420 of user device 100. For example, device data field 750 may include information from system hardware/software detector 520 and/or applications profile table 530 of a particular device 100.

Configuration data field 760 may include configuration information received from developer device 240. For example, configuration data field 760 may include configuration settings to optimize presentation of a particular application for a particular user device 100 or a particular make/model of user device 100.

Although FIG. 7 shows exemplary fields of data structure 700, in other implementations, data structure 700 may include different fields or additional fields than those depicted in FIG. 7.

Figure 8:
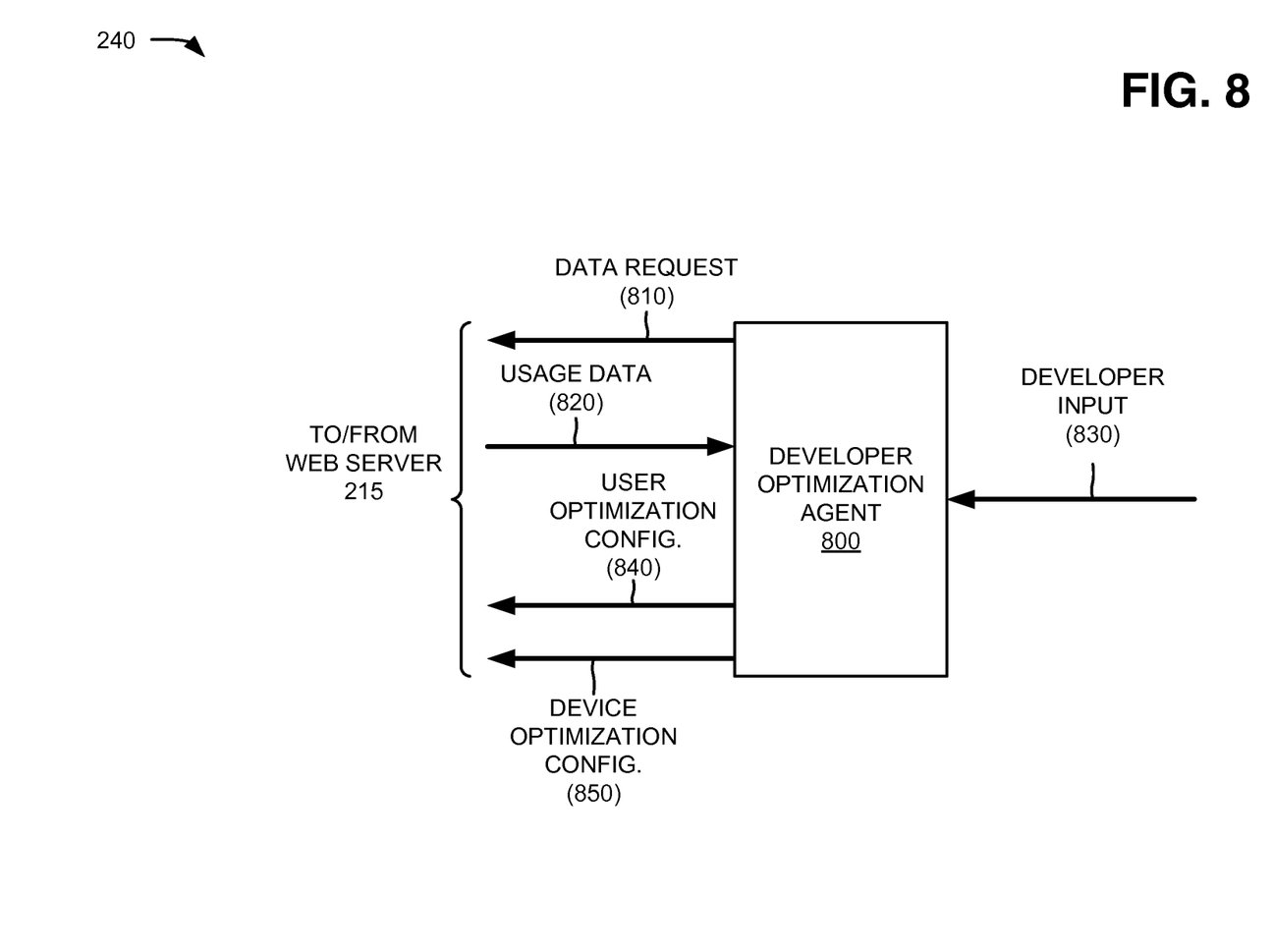
FIG. 8 is a diagram illustrating an exemplary functional component of a developer device of the network of FIG. 2.

FIG. 8 is a diagram illustrating an exemplary functional component of developer device 240. The functional component may be implemented by, for example, processing unit 320 in conjunction with memory 330. As shown in FIG. 8, device 240 may include a developer optimization agent 800.

Developer optimization agent 800 may generally provide a standardized communication interface to retrieve user device 100 data and to provide configuration information for optimal performance of particular applications. For example, developer optimization agent 800 may provide a data request 810 to web server 220 (e.g., data manager 620) to obtain user device information relating to a particular application. Data request 810 may include, for example, a particular account ID and application ID for which data is requested. Data request 810 may be a recurring request (e.g., at particular intervals) or a specific request for user device information.

Developer optimization agent 800 may receive usage data 820 from web server 220 (e.g., data manager 620). Usage data 820 may be provided in response to data request 810. In another implementation, usage data 820 may be provided according to a pre-arranged schedule (e.g., hourly, daily, weekly, etc.) without need for a particular data request 810. Usage data 820 may include, for example, user device data from database 230.

Based on usage data 820, a third-party developer may identify configuration settings for particular user devices 100 or particular makes/models of user devices 100 that can be used to provide an optimized user experience. These configuration settings may be provided to developer optimization agent 800 as developer input 830.

Based on developer input 830, developer optimization agent 800 may provide user optimization configuration 840 and/or device optimization configuration 850 to web server 220 (e.g., data manager 620). User optimization configuration 840 may include configuration settings (e.g., screen scrolling speed, waiting thread queue size, memory allocations, etc.) for a particular user device 100 based on both device parameters and particular user behavior. Device optimization configuration 850 may include configuration settings for a particular make/model of user device 100 based on device parameters and/or a compilation of different user behaviors. In one implementation, developer optimization agent 800 may use a standardized format to provide user optimization configuration 840 and device optimization configuration 850 to permit storage by web server 220 and delivery to user devices 100.

Figure 9:
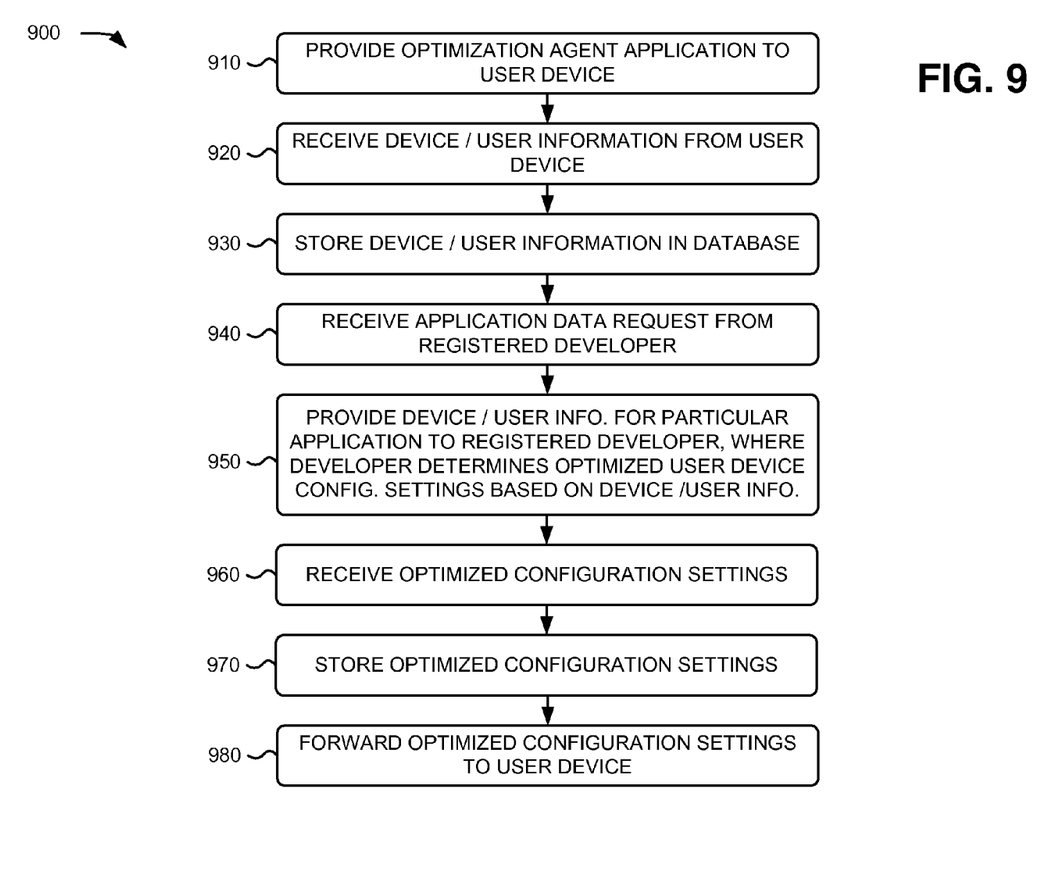
FIG. 9 is a flow diagram illustrating an exemplary process for providing optimized configuration settings for particular applications, according to an implementation described herein.

FIG. 9 is a flow diagram illustrating an exemplary process 900 for providing optimized configuration settings for particular applications according to an implementation described herein. In one implementation, process 900 may be performed by web server 220. In another implementation, some or all of process 900 may be performed by another device or group of devices, including or excluding web server 220. For example, user device 100 and/or developer device 240 may perform one or more parts of process 900.

As shown in FIG. 9, process 900 may include providing an optimization agent application to a user device (block 910), receive device/user information from the user device (block 920), and storing the device/user information in a database (block 930). For example, service provider network 210 may permit user device 100 to download an optimizing agent (e.g., mobile optimization component 420) to enable collection of user device information and receiving/implementation of optimization data. Web server 220 (e.g., data manager 620) may receive user device data associated with particular applications and store the user device data in database 230. User device data may include, for example, information collected by mobile optimization component 420.

Process 900 may also include receiving an application data request from a registered developer (block 940), and providing the device/user information for the particular application to a registered developer, where developer determines optimized user device configuration settings based on the device/user information (block 950). For example, web server (e.g., data manager 620) may receive requests for user device information from developer devices 240. Based on an account and application associated with the request, web server 220 may provide user device data to developer device 240. Based on the user device data, a third-party developer may identify configuration settings for particular user devices 100 or particular makes/models of user devices 100 that can be used to provide an optimized user experience. For example, a third-party developer for a particular application may provide settings to adjust the screen scrolling speed and/or waiting thread queue size for a particular make/model of user device 100.

Process 900 may include receiving optimized configuration settings (block 960), storing the optimized configuration settings (block 970), and forwarding the optimized configuration settings to a user device (block 980). For example, web server 220 (e.g., data manager 620) may receive configuration optimization data from developer device 240 and store the optimization data in database 230. Web server 220 may provide the optimization data to user devices 100 upon request. In another implementation, web server 220 may actively push configuration optimization data to user devices 100.

Figure 10:
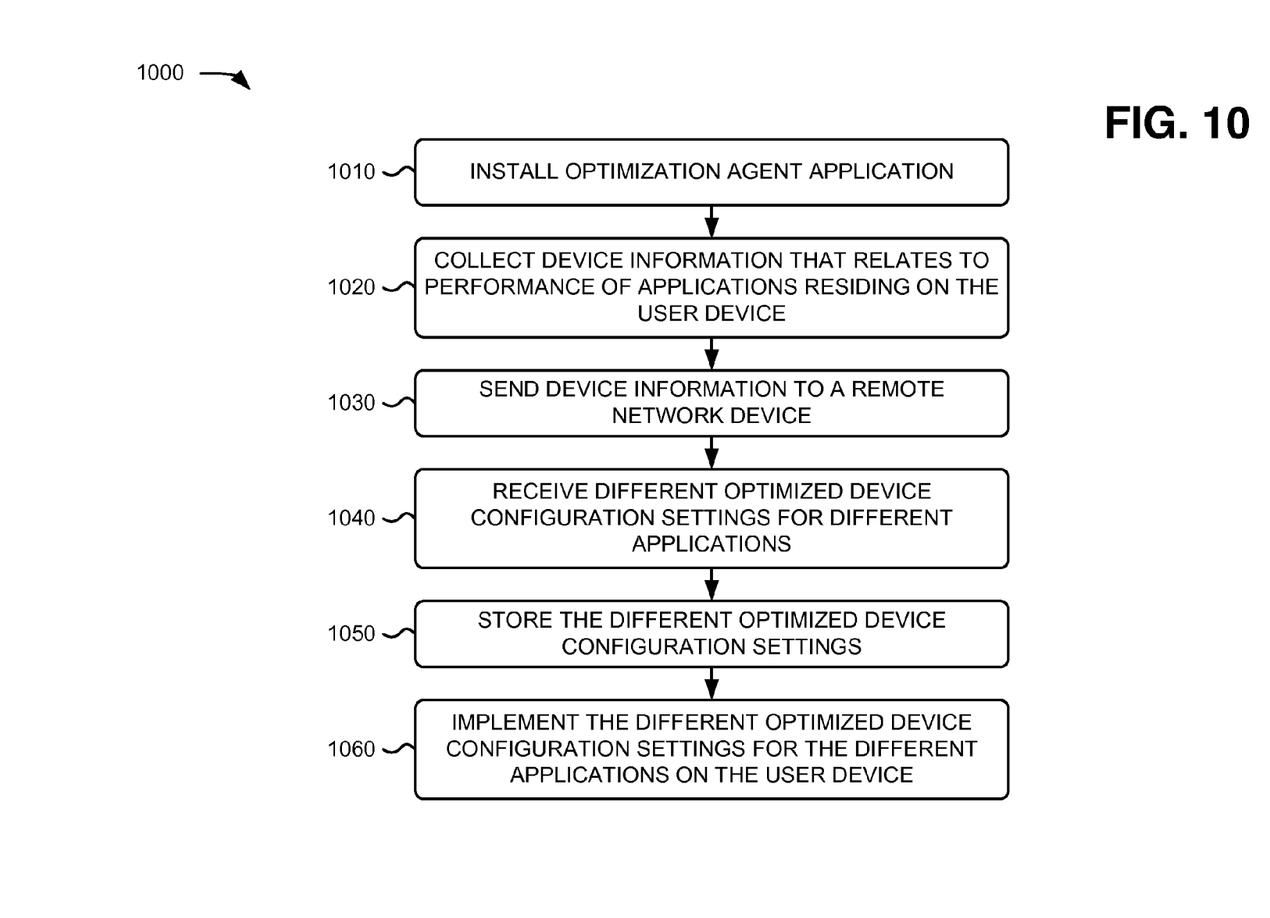
FIG. 10 is a flow diagram illustrating an exemplary process for obtaining optimized configuration settings for particular applications, according to an implementation described herein.

FIG. 10 is a flow diagram illustrating an exemplary process 1000 for obtaining optimized configuration settings for particular applications according to an implementation described herein. In one implementation, process 1000 may be performed by user device 100. In another implementation, some or all of process 1000 may be performed by another device or group of devices, including or excluding user device 100. For example, web server 220 and/or developer device 240 may perform one or more parts of process 1000.

As shown in FIG. 10, process 1000 may include installing an optimization agent application (block 1010), collecting device information that relates to performance of applications residing on the user device (block 1020), and sending the device information to a remote network device (block 1030). For example, user device 100 (e.g., mobile optimization component 420) may be downloaded, for example, from service provider network 210. Mobile optimization component 420 may collect information from user device 100 and send the information to web server 220. The collected information may include device information, operating system information, application-relevant information, and/or user usage patterns. Web server (e.g., service API 510) may also retrieve collected information (e.g., from system hardware/software detector 520 and/or application applications profile table 530) and send to web server 220.

Process 1000 may also include receiving different optimized device configuration settings for different applications (block 1040), storing the different optimized device configuration settings (block 1050), and implementing the different optimized device configuration settings for the different applications on the user device (block 1060). For example, user device 100 (e.g., service API 510) may receive, from web server 220, optimization settings for particular applications. User device 100 may store the optimization settings, for example, in applications profile table 530 for responding to requests from applications 410. Applications 410 may obtain optimized configuration settings from mobile optimization component 420 to improve the user experience.

According to implementations described herein, a network device may provide an agent application to a user device. The network device may receive, from the user device, device information that relates to performance of one or more applications residing on the user device. The network device may provide, to a device associated with a registered developer account, a portion of the device information that is associated with a particular application. The network device may receives, from the device associated with the registered developer account, optimized device configuration settings for the particular application on the user device. The network device may store the optimized configuration settings for the particular application and may send, to the user device, the optimized configuration settings for the particular application.

Systems and methods described herein may provide a standard architecture for collecting user device data so that mobile application developers can focus on application business logic and optimization itself, without tending to collection data transfer procedures and collection data maintenance. The systems and methods may improve the mobile user experience and provide users with centralized control for the settings of data collection. The systems and methods may simplify user device data collection and eliminate redundancy of data collection components within individual applications.

In the preceding specification, various preferred embodiments have been described with reference to the accompanying drawings. Various modifications and changes may be made thereto, and additional embodiments may be implemented, without departing from the broader scope of the invention as set forth in the claims that follow. The specification and drawings are accordingly to be regarded in an illustrative rather than restrictive sense. For example, while series of blocks have been described with respect to FIGS. 9 and 10, the order of the blocks may be modified in other implementations. Further, non-dependent blocks may be performed in parallel.

Different aspects of the description provided above may be implemented in many different forms of software, firmware, and hardware in the implementations illustrated in the figures. The actual software code or specialized control hardware used to implement these aspects is not limiting of the invention. Thus, the operation and behavior of these aspects were described without reference to the specific software code—it being understood that software and control hardware can be designed to implement these aspects based on the description herein.

Further, certain portions of the invention may be implemented as a "component" or "system" that performs one or more functions. These components/systems may include hardware, such as a processor, an ASIC, or a FPGA, or a combination of hardware and software.

No element, act, or instruction used in the present application should be construed as critical or essential to the invention unless explicitly described as such. Also, as used herein, the article "a" and "one of" is intended to include one or more items. Further, the phrase "based on" is intended to mean "based, at least in part, on" unless explicitly stated otherwise.

What is claimed is:

1. A method, comprising:
    registering, by a network device, unique account identifiers for third-party developer accounts and unique application identifiers for applications associated with the third-party developer accounts;
    providing, by the network device and to a mobile device, an optimization agent application that can be accessed via multiple applications residing on the mobile device, wherein the optimization agent application provides self-adaptive application adjustments for optimizing the multiple applications on the mobile device;
    receiving, by the network device and from the optimizing agent application on the mobile device, mobile device information that relates to performance of the multiple applications residing on the mobile device, wherein the mobile device information includes device parameters and user behaviors relating to the multiple applications, and wherein portions of the mobile device information associate the device parameters and user behaviors with particular applications of the multiple applications;
    providing, by the network device and to a device associated with one of the third-party developer accounts, one of the portions of the mobile device information, wherein the one of the portions is associated with a particular application via the unique account identifier and the unique application identifier;
    receiving, by the network device and from the device associated with the third-party developer accounts, optimized configuration settings for the particular application on the mobile device, wherein the optimized configuration settings are based on the portion of the mobile device information;
    storing, by the network device and in a memory, the optimized configuration settings for the particular application; and
    sending, by the network device and to the mobile device, the optimized configuration settings for the particular application,
    wherein the optimized configuration settings improve a user experience for the particular application on the mobile device, and wherein the self-adaptive application adjustments are applied to the multiple applications that do not have other developer optimized configuration settings.

2. The method of claim 1,
    wherein the optimization agent application:
    collects the mobile device information from the mobile device,
    sends the mobile device information to the network device,
    receives the developer optimized configuration settings,
    implements, via standardized application programming interfaces (APIs), the optimized configuration settings for the particular application on the mobile device, and
    implements, via the APIs, the self-adaptive application adjustments for other of the multiple applications on the mobile device.

3. The method of claim 1, further comprising:
    storing, in the memory, the mobile device information; and
    receiving, by the network device and from the one of the third-party developer accounts, a request for the portion of the mobile device information associated with the particular application.

4. The method of claim 1, wherein the mobile device information includes:
    a device model,
    location information, and
    a memory cache size.

5. The method of claim 1, wherein the mobile device information includes:
    operating system information for the mobile device.

6. The method of claim 5, wherein the mobile device information further includes:

application-relevant information for the mobile device, or user usage patterns for the mobile device.

7. The method of claim 1, wherein storing the optimized configuration settings for the particular application includes:
creating a record that includes one of the unique account identifiers and one of the unique application identifiers.

8. The method of claim 1, wherein storing the optimized configuration settings for the particular application further includes:
creating a record that includes a device model or unique device identifier for the mobile device.

9. The method of claim 1, wherein the mobile device information further includes at least one of a network signal strength or a network speed.

10. A network device, comprising:
a network interface to communicate with one or more remote systems;
one or more memories to store instructions; and
one or more processors configured to execute instructions in the one or more memories to:
register unique account identifiers for third-party developer accounts and unique application identifiers for applications associated with the third-party developer accounts,
provide, to a mobile device, an optimization agent application that can be accessed via multiple applications residing on the mobile device, wherein the optimization agent application provides self-adaptive application adjustments for optimizing the multiple applications on the mobile device,
receive, from the optimizing agent application, mobile device information that relates to performance of the multiple applications residing on the mobile device, wherein the mobile device information includes device parameters and user behaviors relating to the multiple applications, and wherein portions of the mobile device information associate the device parameters and user behaviors with particular applications of the multiple applications,
provide, to a device associated with one of the third-party developer accounts, one of the portions of the mobile device information, wherein the one of the portions is associated with a particular application via the unique account identifier and the unique application identifier,
receive, from the device associated with the third-party developer accounts, optimized configuration settings for the particular application on the mobile device, and
send, to the mobile device, the optimized configuration settings for the particular application,
wherein the optimized configuration settings improve a user experience for the particular application on the mobile device, and wherein the self-adaptive application adjustments are applied to the multiple applications that do not have other developer optimized configuration settings.

11. The network device of claim 10, wherein the one or more processors are further configured to execute instructions in the one or more memories to:
store, in the one or more memories, the mobile device information that relates to performance of the multiple applications residing on the mobile device, and
store, in the one or more memories, the optimized configuration settings for the particular application.

12. The network device of claim 11, wherein, when storing the optimized configuration settings for the particular application, the one or more processors are further configured to execute instructions in the one or more memories to:
create a record that includes one of the unique account identifiers and one of the unique application identifiers associated with the optimized configuration settings.

13. The network device of claim 10, wherein the one or more processors are further configured to execute instructions in the one or more memories to:
receive, from one of the third-party developer accounts, a request for a portion of the mobile device information associated with the particular application, and
receive, from the mobile device, a request for the optimized configuration settings for the particular application.

14. The network device of claim 10, wherein the mobile device information includes:
a device model, and
operating system information for the mobile device.

15. The network device of claim 14, wherein the mobile device information further includes:
user usage patterns for the mobile device.

16. The network device of claim 10, wherein, when providing the mobile device information associated with the particular application, the one or more processors are further configured to execute instructions in the one or more memories to:
push the mobile device information to a developer optimization agent residing on the device associated with one of the third-party developer accounts.

17. A method, comprising:
installing, by a mobile device, an optimization agent application that can be accessed via multiple applications residing on the mobile device, wherein the optimization agent application provides self-adaptive application adjustments for optimizing the multiple applications on the mobile device;
receiving, by the mobile device and from a user of the mobile device, a user configuration for settings for data collection by the optimization agent application;
collecting, by the optimization agent application and based on the user configuration, mobile device information that relates to performance of the multiple applications residing on the mobile device;
sending, by the optimization agent application, the mobile device information to a remote network device;
receiving, by the optimization agent application, first optimized configuration settings for a first one of the multiple applications; and
receiving, by the optimization agent application, second optimized configuration settings for a second one of the multiple applications, wherein the second optimized configuration settings are different from the first optimized configuration settings;
applying the first optimized configuration settings for the first one of the multiple applications on the mobile device;
applying the second optimized configuration settings for the second one of the multiple applications on the mobile device; and
applying the self-adaptive application adjustments to other of the multiple applications that do not have other developer optimized configuration settings.

18. The method of claim 17, wherein the mobile device information that relates to performance of the multiple applications residing on the mobile device includes:
a device model,
location information, and
a memory cache size.

19. The method of claim 17, further comprising:
 storing, in a local memory associated with the optimization agent application, the first optimized configuration settings and the second optimized configuration settings.

20. The method of claim 17, wherein the mobile device information that relates to performance of the multiple applications residing on the mobile device includes at least one of:
 a network signal strength, or
 a network speed.

\* \* \* \* \*